(12) United States Patent
Li et al.

(10) Patent No.: US 7,846,216 B2
(45) Date of Patent: Dec. 7, 2010

(54) METHOD FOR MAKING COLLOIDAL NANOCRYSTALS

(75) Inventors: Ya-Dong Li, Beijing (CN); Feng Bai, Beijing (CN); Ding-Sheng Wang, Beijing (CN); Zi-Yang Huo, Beijing (CN); Wei Chen, Beijing (CN); Li-Ping Liu, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 600 days.

(21) Appl. No.: 12/002,190

(22) Filed: Dec. 14, 2007

(65) Prior Publication Data

US 2008/0247932 A1    Oct. 9, 2008

(30) Foreign Application Priority Data

Apr. 6, 2007    (CN) .................. 2007 1 0073978

(51) Int. Cl.
    *C01B 15/013*    (2006.01)
(52) U.S. Cl. .................. 23/293 R; 23/295 R
(58) Field of Classification Search ............... 23/293 R, 23/295 R
    See application file for complete search history.

(56) References Cited

FOREIGN PATENT DOCUMENTS

| | | |
|---|---|---|
| CN | 1552547 A | 12/2004 |
| TW | 200426114 A | 12/2004 |
| TW | 200626730 A | 8/2006 |

*Primary Examiner*—Edward M Johnson
(74) *Attorney, Agent, or Firm*—Jeffrey T. Knapp

(57) ABSTRACT

A method for making colloidal nanocrystals includes the following steps: dissolving a nanocrystal powder in an organic solvent, and achieving a solution A of a concentration of 1-30 mg/ml; dissolving a surfactant in water, and achieving a solution B of a concentration of 0.002-0.05 mmol/ml; mixing the solution A and the solution B in a volume ratio of 1:(5-30), and achieving a mixture; stirring and emulsifying the mixture, until an emulsion C is achieved; removing the organic solvent from the emulsion C, and achieving a deposit; then washing the deposit with deionized water, and achieving colloidal nanocrystals. The present method for making colloidal nanocrystals is economical and timesaving, and has a low toxicity associated therewith. Thus, the method is suitable for industrial mass production. The colloidal nanocrystals made by the present method have a readily controllable size, a narrow size distribution, and good configuration.

11 Claims, 5 Drawing Sheets

METHOD FOR MAKING COLLOIDAL NANOCRYSTALS

RELATED APPLICATIONS

This application is related to commonly-assigned, co-pending application: U.S. patent application Ser. No. 12/002,128, entitled "METHOD FOR MAKING MESOPOROUS MATERIAL", filed Dec. 14, 2007 and U.S. patent application Ser. No. 12/002,139, entitled "METHOD FOR MAKING MONODISPERSE SILVER AND SILVER COMPOUND NANOCRYSTALS", filed Dec. 14, 2007. The disclosure of the above-identified application is incorporated herein by reference.

BACKGROUND

1. Field of the Invention

The present invention relates to a method for making colloidal nanocrystals.

2. Discussion of Related Art

Nanocrystals are defined as nanometer sized, single crystalline fragments of the corresponding bulk crystals. The term "nanometer-sized" is typically used to refer to particles with an approximate size range between about 1 nanometer (nm) to about 1000 nm in diameter. More typically, "nanometer-sized" refers to an approximate range of sizes between about 1 nm-100 nm in diameter. Nanotechnology is one of the fastest growing fields in industry. Nano-based microscopic devices have countless applications. Currently, the method for making nanomaterials is a key area of focus for research scientists. Colloidal nanocrystals are nanometer-sized fragments of corresponding bulk crystals dispersed in solvents or other types of matrices. Colloidal nanocrystals are one of the many materials being explored for a variety of applications because of their novel, size dependent properties. For example, the size dependent emission properties of semiconductor nanocrystals make them highly desirable as labeling reagents for biomedical applications and as color tunable emitting materials in LEDs and lasers.

Conventional methods for making colloidal nanocrystals include solvent volatilization method, surface self-assembly method, and settling self-assembly method. However, these methods need special and toxic raw materials that limit their applications and their suitability for mass-production, and the size, size distribution, and crystallinity of the colloidal crystals are not controllable.

Therefore, there is a growing demand for a less toxic, more controllable method for simpler mass production of colloidal crystals.

SUMMARY OF THE INVENTION

A method for making the colloidal crystals includes the following steps: dissolving a nanocrystal powder in an organic solvent, and achieving a solution A of a concentration of 1-30 mg/ml; dissolving a surfactant in water, and achieving a solution B of a concentration of 0.002-0.05 mmol/ml; mixing the solution A and the solution B in a volume ratio of 1:(5-30), and achieving a mixture; stirring and emulsifying the mixture, until a emulsion C is achieved; removing the organic solvent from the emulsion C, and achieving a deposit; washing the deposit with deionized water, and achieving colloidal nanocrystals.

Compared with the conventional method, with the inorganic metal salt and octadecyl amine as the raw material, the present method for making colloidal nanocrystals is economical, timesaving and low toxic, and thus is suitable for industrial mass production. The colloidal nanocrystals made by the present method have good size control, narrow size distribution and good crystallinity, and therefore have significant advantages for applications in catalysis, ceramics, energy storage, magnetic data storage, sensors, ferrofluids, etc.

BRIEF DESCRIPTION OF THE DRAWINGS

Many aspects of the present method can be better understood with reference to the following drawings. The components in the drawings are not necessarily to scale, the emphasis instead being placed upon clearly illustrating the principles of the present method.

Figure 1:
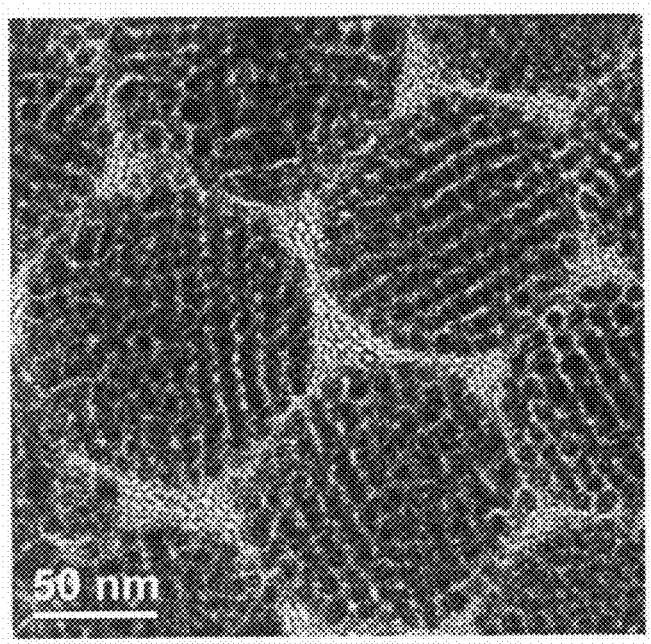
FIG. 1 is a transmission electron microscope (TEM) image of colloidal nanocrystals of barium chromate according to a first embodiment.

The exemplifications set out herein illustrate at least one preferred embodiment of the present method, in one form, and such exemplifications are not to be construed as limiting the scope of the invention in any manner.

DETAILED DESCRIPTION OF PREFERRED EMBODIMENTS

Reference will now be made, in detail, to the drawings to describe embodiments of the present method.

One method for making colloidal nanocrystals includes the following: (1) a nanocrystal powder coated with a certain ligand is dissolved in an organic solvent, and a solution A with concentration of 1-30 mg/ml is achieved; (2) a surfactant is dissolved in water, and a solution B with concentration of 0.002-0.05 mmol/ml is achieved; (3) a volume ratio of 1:(5-30) mixture of the solution A and B is stirred and emulsified, until a uniform and stable emulsion C is achieved; (4) the organic solvent of emulsion C is removed, and a deposit is achieved; (5) the deposit is then washed with deionized water, and the colloidal nanocrystals are achieved.

In step 1, the nanocrystal powder is a material selected from the group consisting of metal nanocrystals, oxide nanocrystals, and metal fluoride nanocrystals. Additionally, the nanocrystals are in a shape of sphere, bar, sheet, or cube, and have diameters in the range of 0.5-100 nm. The ligand coating the nanocrystals is a material selected from the group consisting of oleic acid, oleyl amine, octadecyl amine, odecyl mercaptan, trioctylphosphine oxide and triphenyl phosphine.

The organic solvent is a material selected from the group consisting of cyclohexane, n-hexane, trichloromethane and toluene.

In step 2, the surfactant can be anionic surfactant, cationic surfactant, amphoteric surfactant, or nonionic surfactant, such as sodium lauryl sulfate (SDS) and hexadecyltrimethyl ammonium bromide (CTAB).

In step 3, the process of emulsification can be accomplished through the use of a high-speed stirring method, an ultrasonic method, or the use of a colloid mill.

In step 4, the organic solvent is removed by a heating process using a temperature in the range of 40-95° C. for 1-20 hours, or by a reduced pressure distillation process for 1-20 hours.

The present method is further illustrated by the following examples, which are not to be construed in any way as imposing limitation upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present method or the scope of the appended claims.

EXAMPLE 1

Barium chromate ($BaCrO_4$) nanocrystals coated with oleic acid are provided. The $BaCrO_4$ nanocrystals have a diameter of about 7 nm and a dispersing coefficient of about 4.3%. The $BaCrO_4$ nanocrystals are dissolved in an organic solvent of cyclohexane, and a cyclohexane solution with concentration of about 5 mg/ml is achieved. A surfactant of sodium lauryl sulfate (SDS) of 28 mg is dissolved in a solvent of 10 ml of deionized water, and a water solution with a concentration of about 0.01 mmol/ml is achieved. 1 ml of cyclohexane solution is mixed with the deionized water solution, further emulsified by an ultrasonic method, until a uniform and stable emulsion is achieved. Thereafter, the emulsion is heated to 70° C. for 5 h by a water heating method, in order to remove the organic solvent therefrom, and a deposit is achieved. The deposit is then washed with deionized water, and the $BaCrO_4$ colloidal nanocrystals are achieved. Then, the $BaCrO_4$ colloidal nanocrystals are dispersed in water to avoid re-aggregation.

Figure 2:
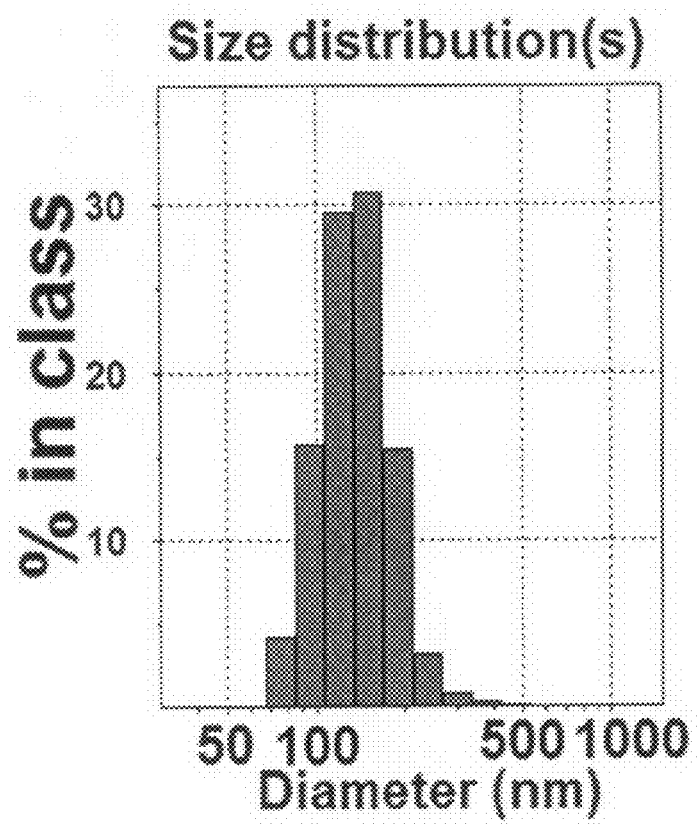
FIG. 2 is a diameter distribution curve of the colloidal nanocrystals of barium chromate according to a first embodiment
Figure 3:
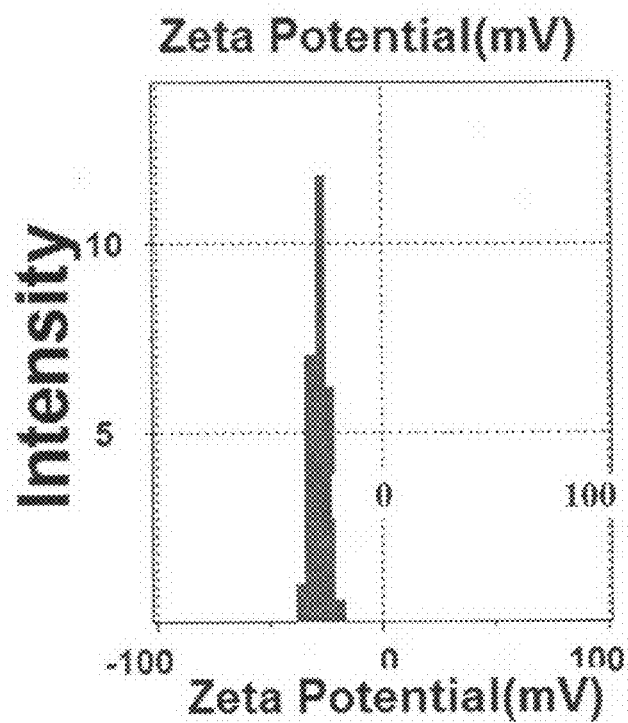
FIG. 3 is a zeta-potential diagram of the colloidal nanocrystals of barium chromate according to a first embodiment.

Referring to FIG. 1, the $BaCrO_4$ colloidal nanocrystals according to the first embodiment have an ordered configuration. Referring to FIG. 2, the $BaCrO_4$ colloidal nanocrystals have a uniform diameter distribution in a range of about 100-140 nm. Referring to FIG. 3, the surfaces of the $BaCrO_4$ colloidal nanocrystals have negative charges, and thus the $BaCrO_4$ colloidal nanocrystals are easily dispersed in water.

EXAMPLE 2

Silver selenide ($Ag_2Se$) nanocrystals coated with octadecyl amine are provided. The $Ag_2Se$ nanocrystals have a diameter of about 10 nm and a dispersing coefficient of about 4.8%. The silver selenide ($Ag_2Se$) nanocrystals are dissolved in an organic solvent of cyclohexane, and a cyclohexane solution with concentration of about 5 mg/ml is achieved. A surfactant of CTAB of 35 mg is dissolved in a solvent of 10 ml of deionized water, and a water solution with a concentration of about 0.01 mmol/ml is achieved. 2 ml of cyclohexane solution is mixed with 10 ml of water solution, further emulsified by ultrasonic method, until a uniform and stable emulsion is achieved. Thereafter, the emulsion is heated to 80° C. for 2 h by water heating method, in order to remove the organic solvent therefrom, and a deposit is achieved. The deposit is then washed with deionized water, and the $Ag_2Se$ colloidal nanocrystals are achieved. Then, the $Ag_2Se$ colloidal nanocrystals are dispersed in water to avoid re-aggregation.

Figure 4:
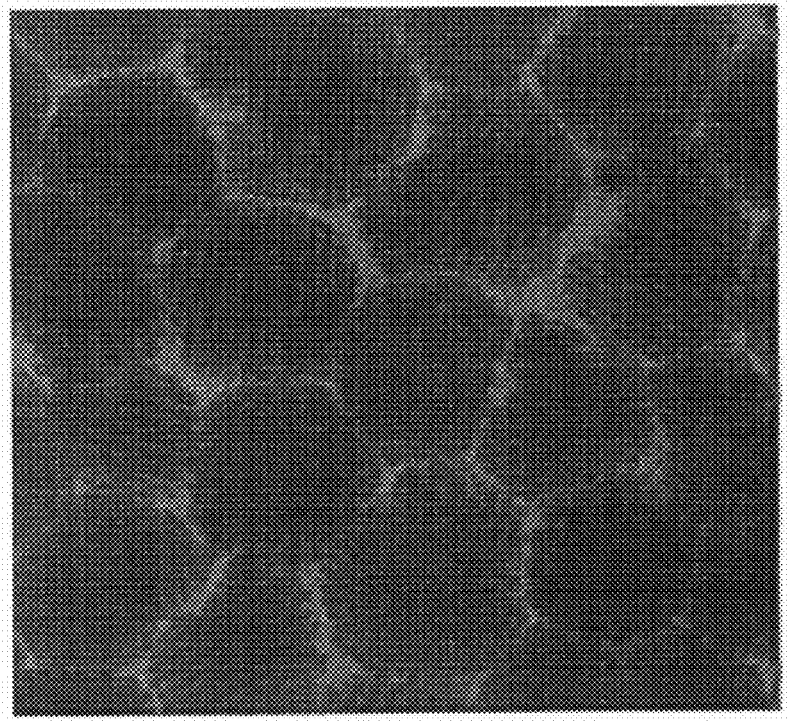
FIG. 4 is a TEM image of colloidal nanocrystals of silver selenide according to a second embodiment.
Figure 5:
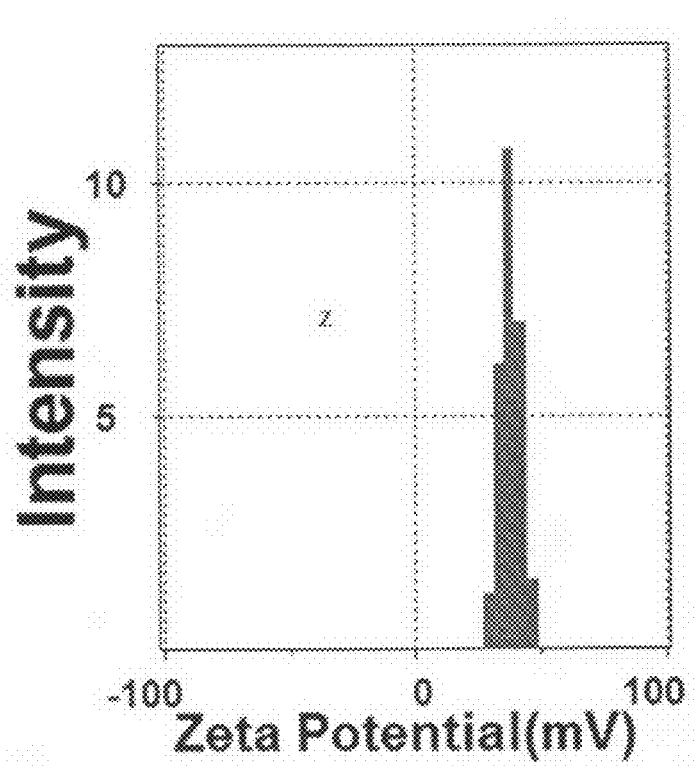
FIG. 5 is a zeta-potential diagram of the colloidal nanocrystals of silver selenide according to a second embodiment.

Referring to FIG. 4, the $Ag_2Se$ colloidal nanocrystals according to the second embodiment have a well-ordered configuration and uniform diameter distribution in a range of about 140-180 nm. Referring to FIG. 5, the surfaces of the $Ag_2Se$ colloidal nanocrystals have negative charges, and thus the $Ag_2Se$ colloidal nanocrystals are easily dispersed in water.

EXAMPLE 3

The cadmium sulfide (CdS) nanocrystals coated with oleic acid are provided. The CdS nanocrystals have a diameter of about 14 nm and a dispersing coefficient of about 7.5%. The CdS nanocrystals are dissolved in an organic solvent of cyclohexane, and a cyclohexane solution with concentration of about 15 mg/ml is achieved. A surfactant of SDS of 28 mg is dissolved in a solvent of 10 ml of deionized water, and a water solution with a concentration of about 0.01 mmol/ml is achieved. 1 ml of cyclohexane solution is mixed with water solution, further emulsified by ultrasonic method, until a uniform and stable emulsion is achieved. Thereafter, the emulsion is heated to 60° C. for 10 hours by water heating method, in order to remove the organic solvent therefrom, and a deposit is achieved. The deposit is then washed with deionized water, and the CdS colloidal nanocrystals are achieved. Then, the CdS colloidal nanocrystals are dispersed in water to avoid re-aggregation.

Figure 6:
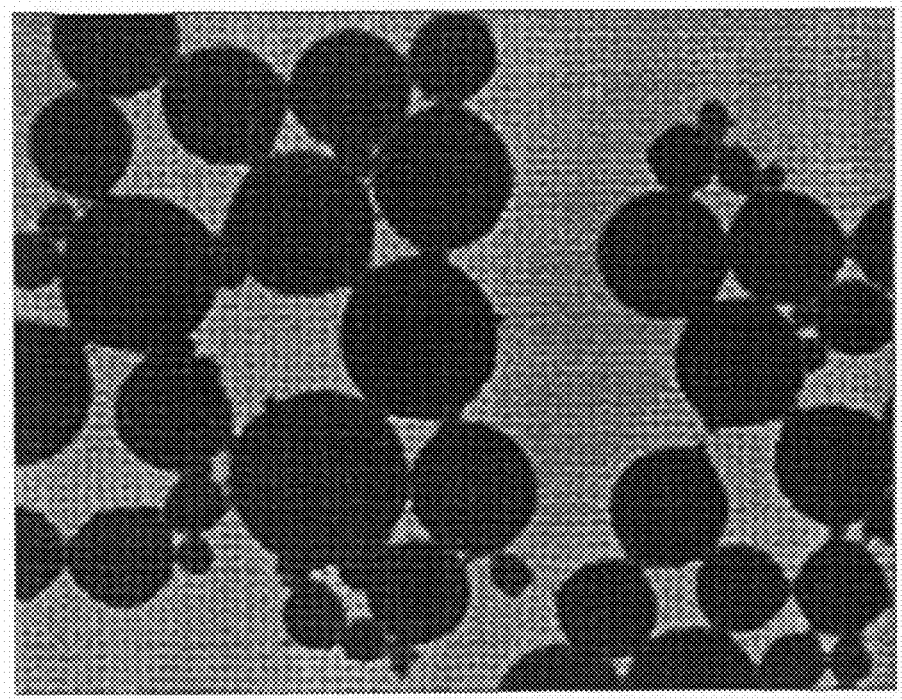
FIG. 6 is a TEM image of colloidal nanocrystals of cadmium sulfide according to a third embodiment.

Referring to FIG. 6, the CdS colloidal nanocrystals according to the third embodiment have a well-ordered configuration and uniform diameter distribution in a range of about 50 nm-1 μm.

EXAMPLE 4

Ferroferric oxide ($Fe_3O_4$) nanocrystals coated with oleic acid are provided. The $Fe_3O_4$ nanocrystals have a diameter of about 7 nm and a dispersing coefficient of about is 4.5%. The $Fe_3O_4$ nanocrystals are dissolved in an organic solvent of cyclohexane, and a cyclohexane solution with concentration of about 15 mg/ml is achieved. A surfactant of SDS of 28 mg is dissolved in a solvent of deionized water of 10 ml, and a water solution with a concentration of about 0.01 mmol/ml is achieved. 1 ml of cyclohexane solution is mixed with water solution, further emulsified by ultrasonic method, until a uniform and stable emulsion is achieved. Thereafter, the emulsion is heated at 60° C. for 10 h by water heating method, in order to removing the organic solvent therefrom, and a deposit is achieved. The deposit is washed with deionized water after separated, and the $Fe_3O_4$ colloidal nanocrystals are achieved. Then, the $Fe_3O_4$ colloidal nanocrystals are dispersed in water to avoid re-aggregation.

Figure 7:
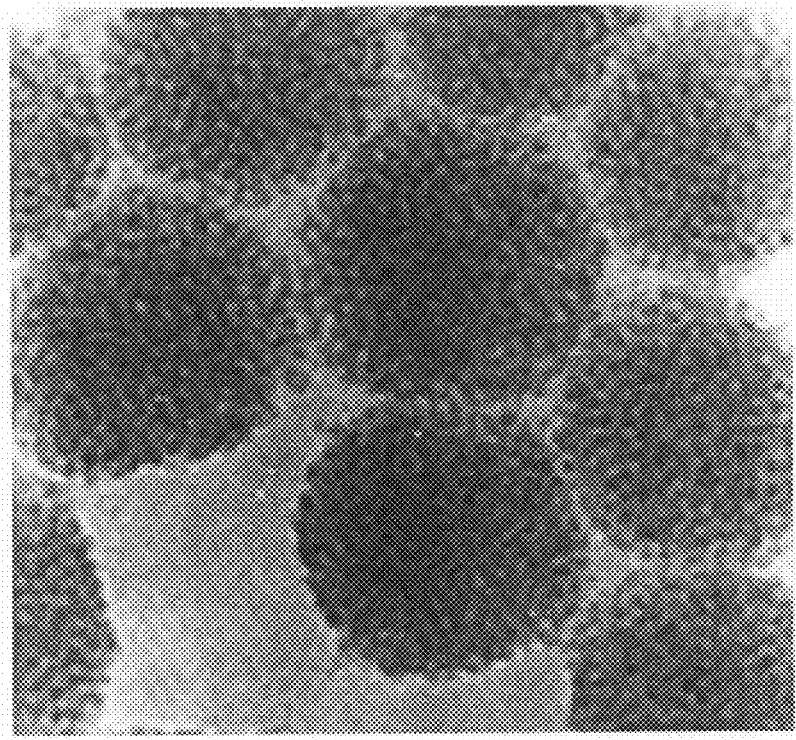
FIG. 7 is a TEM image of colloidal nanocrystals of ferroferric oxide according to a fourth embodiment.

Referring to FIG. 7, the $Fe_3O_4$ colloidal nanocrystals according to the forth embodiment have a well-ordered configure and a uniform diameter distribution in a range of about 100-120 nm.

EXAMPLE 5

The lanthanum fluoride ($LaF_3$) nanocrystals coated with oleic acid are provided. The $LaF_3$ nanocrystals have a diameter of about 8 nm and a dispersing coefficient of about is 3.8%. The $LaF_3$ nanocrystals are dissolved in an organic solvent of cyclohexane, and a cyclohexane solution with concentration of about 5 mg/ml is achieved. A surfactant of SDS of 28 mg is dissolved in a solvent of deionized water of 10 ml, and a water solution with a concentration of about 0.01 mmol/ml is achieved. 1 ml of cyclohexane solution is mixed with water solution, further emulsified by ultrasonic method, until a uniform and stable emulsion is achieved. Thereafter, the emulsion is heated at 70° C. for 5 h by water heating method, in order to removing the organic solvent therefrom, and a deposit is achieved. The deposit is washed with deionized water after separated, and the LaF3 colloidal nanocrystals are achieved. Then, the LaF3 colloidal nanocrystals are dispersed in water to avoid re-aggregation.

Figure 8:
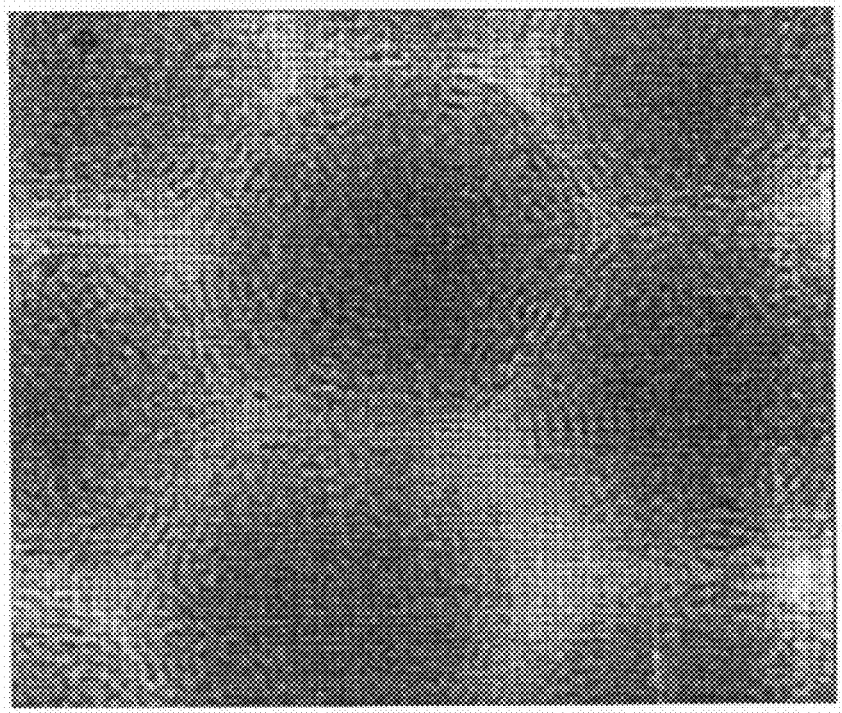
FIG. 8 is a TEM image of colloidal nanocrystals of lanthanum fluoride (LaF3) according to a fifth embodiment.

Referring to FIG. 8, the LaF3 colloidal nanocrystals according to the fifth embodiment have a well-ordered configure and a uniform diameter distribution in a range of about 150-200 nm.

EXAMPLE 6

The titanium oxide (TiO2) nanocrystals coated with oleic acid are provided. The TiO2 nanocrystals have a diameter of about 40-70 nm and a dispersing coefficient of about is 3.8%. The TiO2 nanocrystals are dissolved in an organic solvent of cyclohexane, and a cyclohexane solution with concentration of about 5 mg/ml is achieved. A surfactant of SDS of 28 mg is dissolved in a solvent of deionized water of 10 ml, and a water solution with a concentration of about 0.01 mmol/ml is achieved. 2 ml of cyclohexane solution is mixed with water solution, further emulsified by ultrasonic method, until a uniform and stable emulsion is achieved. Thereafter, the emulsion is heated at 80° C. for 2 h by water heating method, in order to removing the organic solvent therefrom, and a deposit is achieved. The deposit is washed with deionized water after separated, and the TiO2 colloidal nanocrystals are achieved. Then, the TiO2 colloidal nanocrystals are dispersed in water to avoid re-aggregation.

Figure 9:
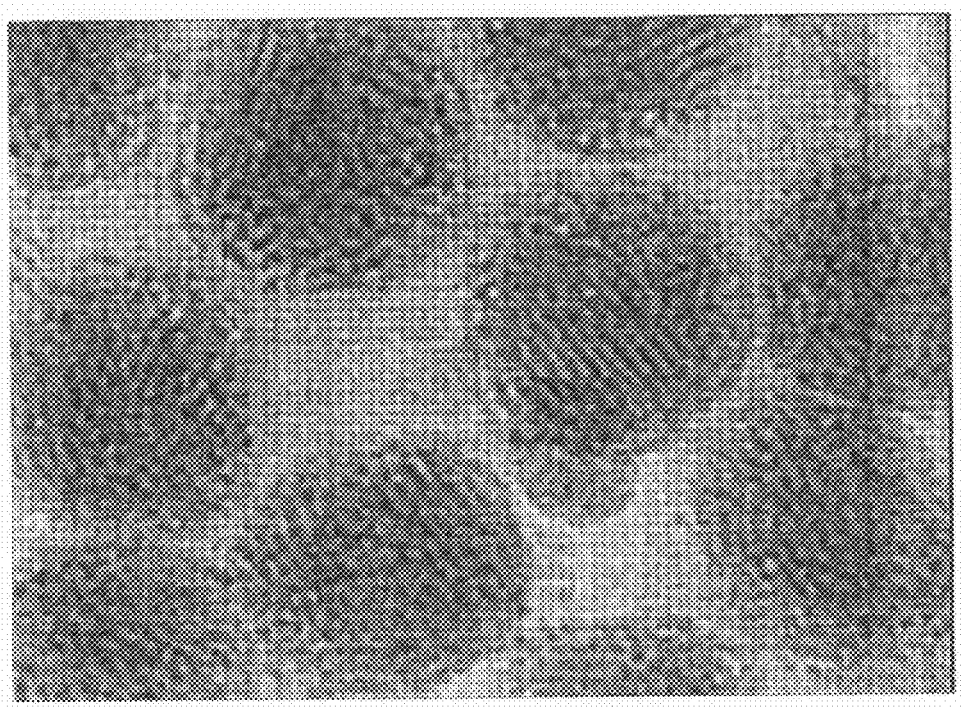
FIG. 9 is a TEM image of colloidal nanocrystals of titanium oxide according to a sixth embodiment.

Referring to FIG. 9, the TiO2 colloidal nanocrystals according to the sixth embodiment have a well-ordered configure and a uniform diameter distribution in a range of about 80-100 nm.

EXAMPLE 7

The LaF3 nanocrystals and aurum (Au) nanocrystals with a mass ratio of 20:1 are mixed, wherein the LaF3 nanocrystals are coated with oleic acid. The mixture is dissolved in an organic solvent of cyclohexane, and a cyclohexane solution with concentration of about 5 mg/ml is achieved. A surfactant of SDS of 28 mg is dissolved in a solvent of deionized water of 10 ml, and a water solution with a concentration of about 0.01 mmol/ml is achieved. 1 ml of cyclohexane solution is mixed with water solution, further emulsified by ultrasonic method, until a uniform and stable emulsion is achieved. Thereafter, the emulsion is heated at 70° C. for 5 h by water heating method, in order to removing the organic solvent therefrom, and a deposit is achieved. The deposit is washed with deionized water after separated, and the mixture of Au and LaF3 colloidal nanocrystals are achieved. Then, the mixture colloidal nanocrystals are dispersed in water to avoid re-aggregation.

Figure 10:
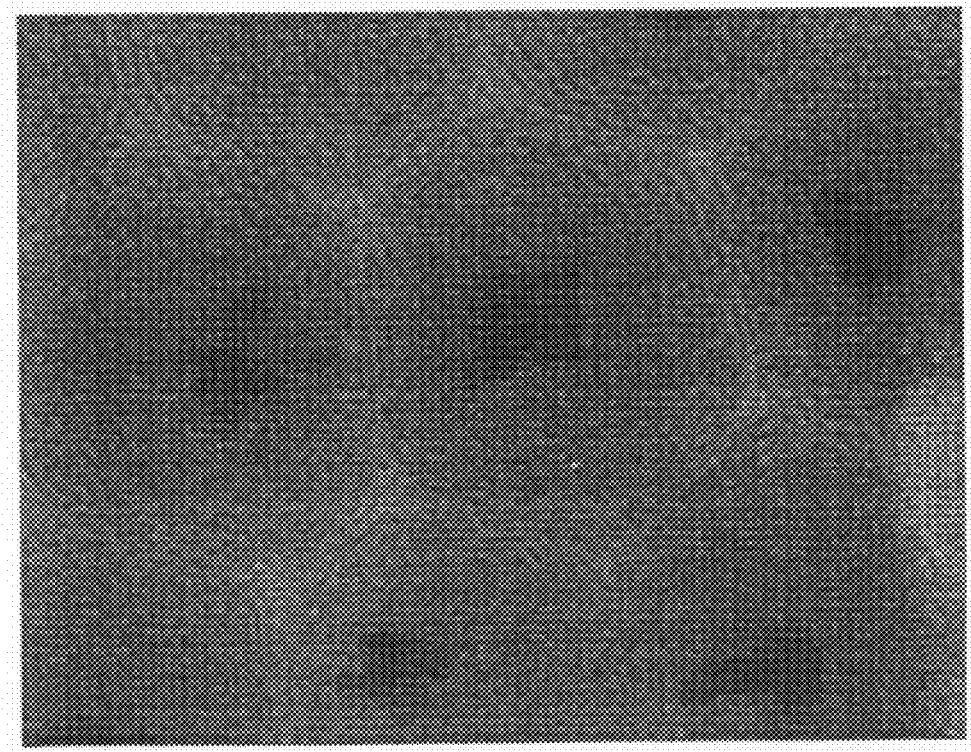
FIG. 10 is a TEM image of colloidal nanocrystals of a mixture of gold (Au) and LaF3 according to a seventh embodiment.

Referring to FIG. 10, the mixture of Au and LaF3 colloidal nanocrystals according to the sixth embodiment have a well-ordered configuration and a uniform diameter distribution in a range of about 150-200 nm. The mixture colloidal nanocrystals have a core-shell structure (i.e., Au acts as a core, and LaF3 acts as a shell).

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A method for making colloidal nanocrystals comprising:
   (1) dissolving a nanocrystal powder in an organic solvent, and achieving a solution A with concentration of 1-30 mg/ml;
   (2) dissolving a surfactant in water, and achieving a solution B with concentration of 0.002-0.05 mmol/ml;
   (3) mixing the solution A and the solution B in a volume ratio of 1: (5-30), and achieving a mixture;
   (4) stirring and emulsifying the mixture, until an emulsion C is achieved;
   (5) removing the organic solvent from the emulsion C, and achieving a deposit; and
   (6) washing the deposit with deionized water, and achieving colloidal nanocrystals.

2. The method for making colloidal nanocrystals as claimed in claim 1, wherein in step (4), the method for emulsifying process is a method selected from the group consisting of high-speed stirring method, ultrasonic method, and colloid mill.

3. The method for making colloidal nanocrystals as claimed in claim 1, wherein in step (5), the process for removing the organic solvent is by heating process at 40-95° C. for 1-20 hours.

4. The method for making colloidal nanocrystals as claimed in claim 1, wherein in step (5), the process for removing the organic solvent is by reduced pressure distillation process for 1-20 hours.

5. The method for making colloidal nanocrystals as claimed in claim 1, wherein the colloidal nanocrystals have a diameter of about 10-1000 nm.

6. The method for making colloidal nanocrystals as claimed in claim 1, wherein nanocrystals of the nanocrystal powder are sphere, bar, sheet, or cube shaped, and in a diameter range of 0.5-100 nm.

7. The method for making colloidal nanocrystals as claimed in claim 1, wherein the nanocrystal powder comprises metal nanocrystals, oxide nanocrystals, or metal fluoride nanocrystals.

8. The method for making colloidal nanocrystals as claimed in claim 1, wherein the nanocrystal powder is coated with a ligand.

9. The method for making colloidal nanocrystals as claimed in claim 8, wherein the ligand is a material selected from the group consisting of oleic acid, oleyl amine, octadecyl amine, odecyl mercaptan, trioctylphosphine oxide, and triphenyl phosphine.

10. The method for making colloidal nanocrystals as claimed in claim 1, wherein the organic solvent is a material selected from the group consisting of cyclohexane, n-hexane, trichloromethane, and toluene.

11. The method for making colloidal nanocrystals as claimed in claim 1, wherein the surfactant can be anionic surfactant, cationic surfactant, amphoteric surfactant or nonionic surfactant.

* * * * *